United States Patent
Buch

(10) Patent No.: US 7,159,220 B2
(45) Date of Patent: Jan. 2, 2007

(54) FLEXIBLE ACCELERATION OF JAVA THREAD SYNCHRONIZATION ON MULTIPROCESSOR COMPUTERS

(75) Inventor: Deep K. Buch, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 726 days.

(21) Appl. No.: 09/968,347

(22) Filed: Sep. 28, 2001

(65) Prior Publication Data

US 2003/0065704 A1 Apr. 3, 2003

(51) Int. Cl.
G06F 9/50 (2006.01)
(52) U.S. Cl. .................................... 718/104
(58) Field of Classification Search ............ 718/1, 718/100–108
See application file for complete search history.

(56) References Cited

U.S. PATENT DOCUMENTS

| | | | |
|---|---|---|---|
| 4,435,766 A | | 3/1984 | Haber et al. |
| 5,669,002 A | | 9/1997 | Buch |
| 5,717,897 A | * | 2/1998 | McCrory ............... 711/141 |
| 5,734,909 A | | 3/1998 | Bennett |
| 5,968,157 A | * | 10/1999 | Joy et al. ............... 710/200 |
| 6,237,043 B1 | | 5/2001 | Brown et al. |
| 6,411,983 B1 | * | 6/2002 | Gallop .................. 718/104 |
| 6,477,597 B1 | | 11/2002 | Sorace et al. |
| 6,662,252 B1 | * | 12/2003 | Marshall et al. ........ 710/200 |
| 6,735,760 B1 | * | 5/2004 | Dice ..................... 717/139 |
| 6,754,898 B1 | * | 6/2004 | Zhang et al. ........... 718/104 |
| 6,792,601 B1 | * | 9/2004 | Dimpsey et al. ........ 718/102 |
| 2001/0014905 A1 | | 8/2001 | Onodera | |

FOREIGN PATENT DOCUMENTS

JP 58-165164 9/1983
WO WO 03/010667 2/2003

OTHER PUBLICATIONS

Dice, David. "Implementing Fast Java Monitors with Relaxed-Locks." USENIX Association. Apr. 23-24, 2001.*
Tarui, Toshiaki et al. "Evaluation of the Lock Mechanism in a Snooping Cache." ACM. 1992.*
Scheurich, C. et al. "The Design of a Lockup-Free Cache for High-Performance Multiprocessors." IEEE. 1988.*
Buhr, Peter A. et al. "Monitor Classification." ACM. Mar. 1995.*
Sippl, Charles J. "Computer Dictionary & Handbook." Sams & Co., Inc. Third Edition. 1980, pp. 50-53.*
Bacon, D.F. et al.; "Thin Locks: Featherweight Synchronization for Java", ACM Sigplan Notices, Association for Comuting Machiner, New York, US, vol. 33, No. 5, May 1998 pp. 258-268 XP000766275 ISSN: 0362-1340.
Sinharoy, B. et al.; "Improving Software MP Efficiency for Sahred Memory Systems", System Sciences, 1996., Proceedings of the Twenty-Ninth Hawaii International Conference on Wailea, HI USA Jan. 3-6, 1996, Los Alamitos CA, USA IEEE Comput. Soc. US vol. 1, Jan. 3, 1996 pp. 111-120, XP010156636 ISBN: 0-8186-7426-1.

* cited by examiner

*Primary Examiner*—Lewis A. Bullock, Jr.
(74) *Attorney, Agent, or Firm*—Blakely, Sokoloff, Taylor & Zafman LLP

(57) ABSTRACT

A method and machine-readable medium measure requests by threads requesting a lock to differentiate "hot" and "cold" locks in accordance with the level of contention for the locks. A hardware accelerator manages access to hot locks to improve performance.

15 Claims, 2 Drawing Sheets

FLEXIBLE ACCELERATION OF JAVA THREAD SYNCHRONIZATION ON MULTIPROCESSOR COMPUTERS

FIELD OF INVENTION

The present invention relates to software and hardware approach for accelerating the performance of Java thread synchronization.

BACKGROUND OF THE INVENTION

Java software running on servers, or even upper end work stations, must be designed to permit execution by a large number of CPUs (Central Processing Units). Java is commonly executed in threads. A thread is a single sequential flow of control that runs within a program. A thread is also called an execution context or a lightweight process. A plurality of threads may run at the same time. Threads will share resources such as global data, memory, critical sections of code, and other resources. Shared resources have associated "locks." A thread must acquire the lock on a resource in order to access the resource.

A key bottle neck that limits performance is the implementation of "locking" or synchronization of access by multiple threads to the same shared resources. In Java programs, a popular access control is the "monitor" structure. The underlying Java virtual machine (JVM), which is embodied in software, provides the runtime environment for the Java program and is responsible for implementing the required locking mechanism. Depending on the implementation approach taken by the JVM and the hardware support for synchronization primitives in the platform, there can be a wide variation of performance on enterprise e-business Java software running on a multiprocessor server.

A common hardware technique used for synchronization and implemented in most processors is an atomic read-modify-write bus cycle, caused by the execution of an instruction such as "XCHG". In an environment in which contention for locks (hence the resources protected by the locks) is heavy, multiple CPUs can execute a locked read-modify-write operation simultaneously in an attempt to secure ownership of the same lock or set of locks. This is referred to as the "thundering herd" problem, and it leads to heavy system bus contention. Consequently, multiprocessor scalability is limited. As a result, severe performance penalties are incurred.

Sample code which illustrates this problem is in table 1 below.

TABLE 1

| 1 | // available. If it is 1, another process is in the critical section. | | | |
|---|---|---|---|---|
| 2 | // | | | |
| 3 | spin_lock | | | |
| 4 | | mov | ar.ccv=0 | //cmpxchg looks for avail (0) |
| 5 | | mov | r2 = 1 | //cmpxchg sets to held (1) |
| 6 | spin: | | | |
| 7 | | ld8 | 41 [ = lock] ;; | //get lock in shared state |
| 8 | | cmp.ne | p1,p0 = r1, r2 | //is lock held (ie. lock == |
| 9 | 1}? | | | |
| 10 | (p1) | br.cond.spnt spin ;; | | //yes, continue spinning |
| 11 | | | | |
| 12 | | cmpxchg8.acqrl = [lock], r2 ;; | | //attempt to grab lock |
| 13 | | cmp.ne p1, p0 = r1, r2 | | // was lock empty? |
| 14 | (p1) | br.cond.spnt spin ;; | | //bummer, continue spinning |

TABLE 1-continued

| 15 | cs_begin | | |
|---|---|---|---|
| 16 | | // critical section code goes here . . . | |
| 17 | cs_end: | | |
| 18 | | st8.rel[lock] = r0 ;; | // release the lock |

In line 4, the process cmpxchg instruction looks for an available lock. In line 5, if an available lock is found, the status of the lock is changed from 0 to 1. At line 9, there is an attempt to grab a lock. At line 10, the question is asked as to whether the lock is empty and the answer is provided at line 11, where the attempt to acquire the lock is unsuccessful and the process must continue until it finds the resource unlocked. It is desirable to minimize the overhead associated with lock contention.

BRIEF DESCRIPTION OF THE DRAWINGS

The present invention is explained by way of exemplification in the following description taken in connection with the following drawings.

Of the drawings.

DETAILED DESCRIPTION OF THE INVENTION

Figure 1:
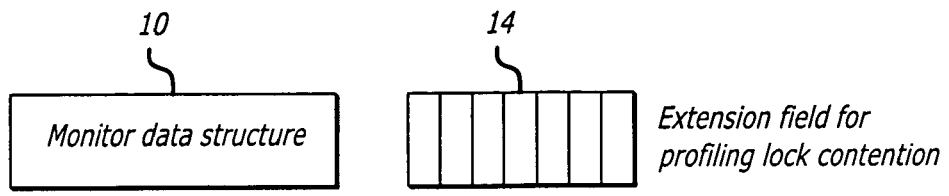
FIG. 1 is a diagram of a software data structure element used in the present invention for monitoring dynamic profiling information on the contention for lock.

Prior art JVMs or equivalent run time environments, are in a unique position due to their roles as a "middle man" between a Java program and the platform on which the program is operating. The platform includes an operating system and hardware. Many JVMs include a just-in-time compiler along with adaptive compilation technology that is used to optimize code where the program spends the most time. FIG. 1 is a diagram of a monitor data structure.

"Monitor" is a technique for controlling access to a shared resource. A monitor is essentially a shared class with explicit queues. The effect of a shared class is achieved in Java by, for example, creating a class in which all fields are private and all methods are synchronized. The only variables that can be accessed by more than one thread are the fields of a monitor. The methods of the monitor are synchronized. Therefore, accesses in the monitor are mutually exclusive. Consequently, the monitor will meet the need to provide mutually exclusive access to threads. One feature of the present invention is providing a capability to collect dynamic profiling information on contentions for locks. To this end, extension field 14 is added to the monitor data structure 10.

Java's "monitor" method supports two kinds of thread synchronization, mutual exclusion and cooperation. Mutual exclusion, which is supported in the Java virtual machine via object locks, enables multiple threads to work independently on shared data without interfering with each other. Cooperation, which is supported in the Java virtual machine via the "wait" and "modify" methods, enables threads to work together to a common goal. The present description is in the context of mutual exclusion.

One thread at a time may acquire a monitor. An extension field 14 is added to the monitor data structure 10 in software of the JVM. The typical monitor data structure is large enough that the addition of a few bits does not lead to a meaningful increase in memory usage, nor does it adversely affect JVM performance. This extension field 14 gives the JVM a knowledge of which Java threads request to gain ownership of a given monitor. A thread acquires the right to use the object, then releases the lock/monitor when it is done. When it again needs to use the object, it reacquires the lock, then again releases the lock when done, and so on. The extension field is used by the JVM to keep a "count" of unique accesses made to the monitor by unique threads in a given time period. If a large number of threads attempt to attain ownership of a monitor during a short time, the count will be a large number, and the lock is identified as a "hot" lock i.e. highly contended lock. If the monitor is primarily accessed by a single thread, the count will be "1," and a lock is "cold" lock.

Figure 2:
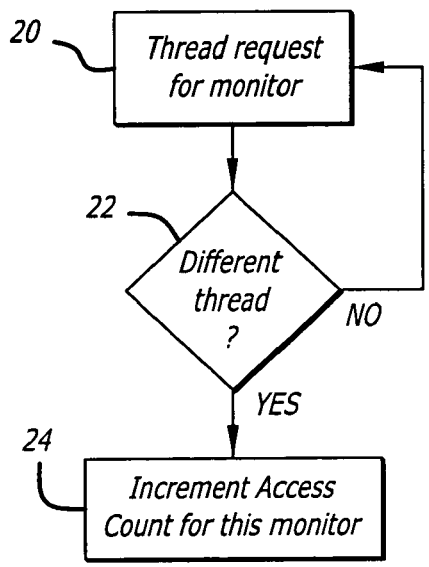
FIGS. 2 and 3 are flow charts illustrating dynamic profiling of lock contention in the Java Virtual Machine.

Once the JVM determines which locks are "hot," it can select the most appropriate synchronization technique to be used for this group of locks. The JVM sets a threshold of contention. This threshold is compared against the actual count value. If the count value exceeds the threshold assigned to identify a hot lock, then the JVM makes a determination to use a hardware accelerated technique for these hot locks. FIG. 2 illustrates the process in the example in which there is low contention for a given lock. In FIG. 2, at block 20, a thread requests a monitor. At block 22, it is determined if the requesting thread is a different thread from the thread previously requesting the monitor. If not, no action is taken to increment the access count for the particular monitor, and the process returns to block 20. If a different thread is contending for the lock from the previous thread, at block 24, the access count for the monitor is incremented.

Figure 3:
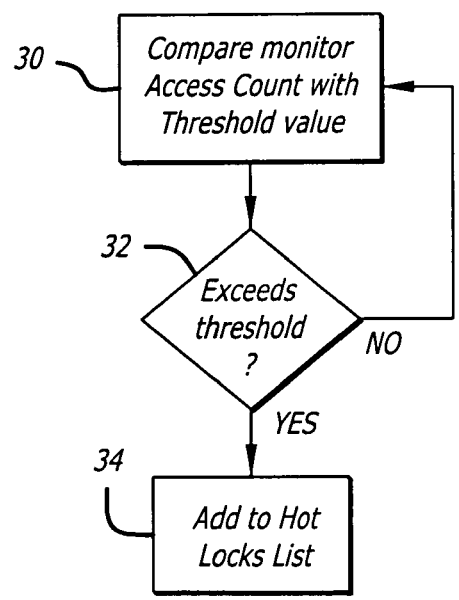

FIG. 3 represents the process of comparing each access count with a threshold value indicative of a hot lock. At block 30, a monitor count is compared with the threshold value. At block 32, if the count does not exceed the threshold value, no further action is taken regarding the particular lock, and the process returns to block 30. If indeed the count achieved at block 24 does exceed the threshold, then operation proceeds to block 34 at which a lock is added to the hot locks list. The processes of FIGS. 2 and 3 may be implemented in the JVM or in hardware. Thus, identification of hot locks is provided.

Figure 4:
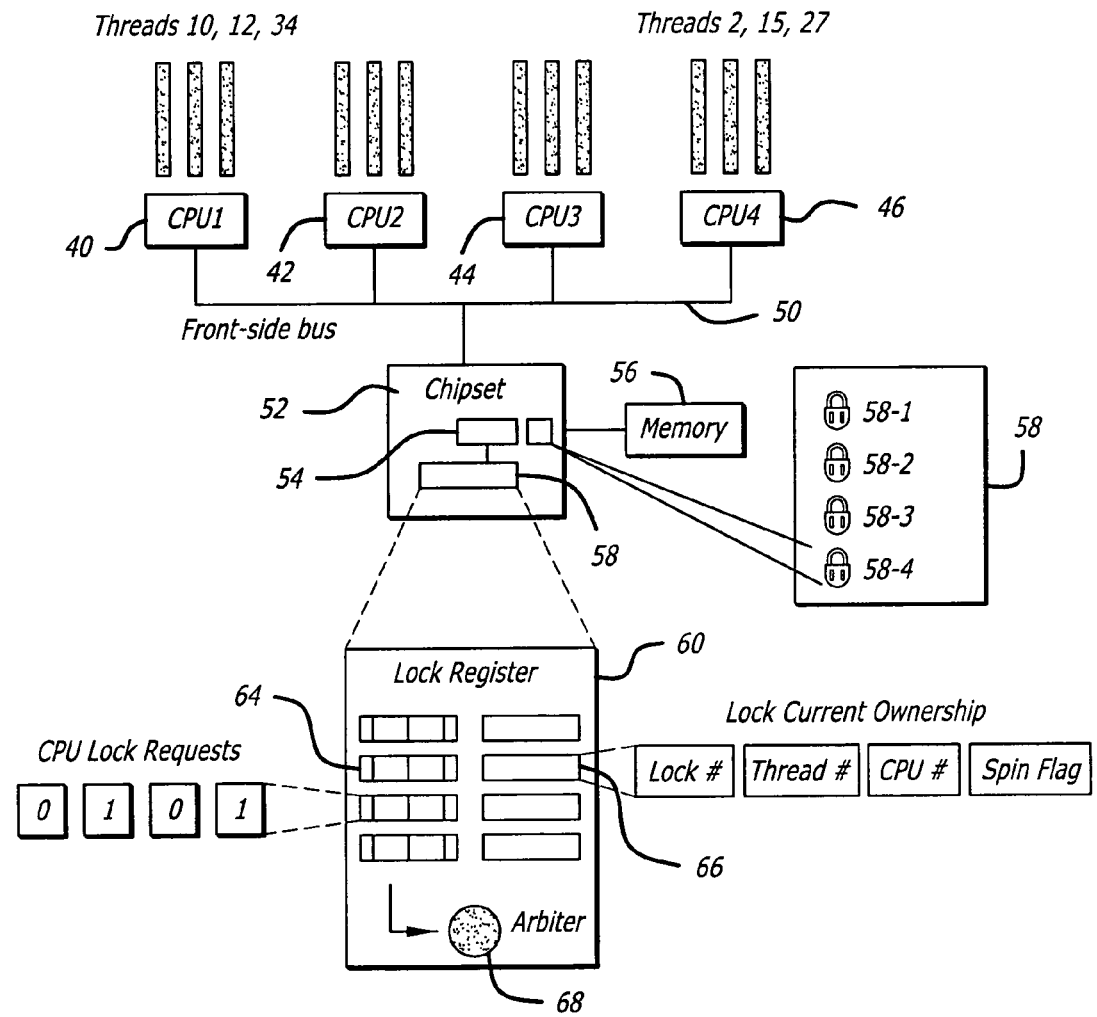
FIG. 4 is a block diagram of hardware providing synchronization acceleration in accordance with the present invention.

Returning to the prior art process of Table 1 above, it is seen that this process inherently provides for a large amount of contention. The contention is caused due to a lack of a central entity that can register the requests of the multiple processors for the lock and also arbitrate the allocation of a lock. Consequently, processors must repeatedly attempt to obtain the lock. If a central entity exists, then the number of read-modify-write cycles, which are expensive in terms of extra steps and extra time, or overhead, required, is greatly reduced. Hardware providing a central entity is illustrated in FIG. 4, which is a block diagram of a 4-CPU bus-based configuration. A 4-CPU configuration is addressed and provide an illustration of a specific embodiment of the present invention. However, other numbers of CPUs may be used. The illustrated structure s scalable. The 4-CPUs are arranged connected to a front side bus. Other configurations may be provided.

In FIG. 4, the 4 CPUs referred to are the CPUs 40, 42, 44 and 46. They each communicate with a data bus 50 which also communicates with a chipset 52. It also comprises the host memory controller 54 coupled to a memory 56. Four locks, 58-1 through 58-4 are illustrated to demonstrate control of access to the memory 56. The memory 56 is a shared resource.

Also on the chipset 52 is a lock register unit 60. While it is not necessary to provide the lock register unit 60 on the chipset 52, it is preferable. The lock register unit 60 includes in the present embodiment, four lock registers 64. Four lock registers 64 are illustrated for convenience. Normally the number of lock registers in a nominal application will be much higher. However, the number of lock registers 64 is limited for ease of explanation. The number of lock registers 64 is platform dependent. At time of initialization, the number of lock registers is communicated to the JVM. JVMs use of hardware acceleration is limited to the number of available lock registers. If no lock registers 64 are available, then the JVM manages synchronization in software.

By providing for flexibility in whether more lock registers 64 will be in hardware or software, a designer is provided with the opportunity to trade off performance versus cost. In the present embodiment, a lock register 64 is provided for each of four locks. The locks are identified as locks 58-1, 58-2, 58-3 and 58-4. Each lock register 66 comprises a counter 64 to register CPU lock requests for the respective lock 58. The lock register unit 60 further comprises an arbiter 68 which will select a CPU to be given access to a lock. The current CPU given access to the lock is referred to as the "winner." A spin flag is provided to the current "loser" CPUs for them to spin on and request access once again. Once the winner CPU releases the lock, the lock register unit 60 via the arbiter 68 selects the next winner, and the above process repeats as long as there are pending requests.

The lock register counter 64 registers CPU lock requests. An ownership a register 66, included to correspond to each lock register 64, registers current lock ownership identified by lock number, thread number, CPU number and spin flag. The lock register 66 stores a thread ID because once a hardware lock has been assigned, the JVM must be assured the thread does not migrate to a different CPU between the lock request and the lock release. Prevention of migration is done through the use of standard operating system calls to request thread affinity-binding.

An alternative implementation (although possibly less ideal) would not require such affinity, but instead would update the CPU number filed and issue a separate spin flag, in case a thread were to migrate from one CPU to another.

The lock register unit 60 can arbitrate between multiple requests using simple round-robin arbitration. This technique is applicable to other arbitration models, such as priority based arbitration.

The provision of the spin flag is highly desirable as illustrated by the following example. If CPU 44 requested a particular lock 62 but lost the arbitration and CPU 40 has ownership, in the traditional prior art model, CPU 44 would spin (wait for a while) and then try again. The CPUs may also be referred to as processors. The trying again is effected by issuing a read-modify-write. As described above, this is the action that leads to bus contention and performance issues. In the present invention, lock register unit 60 in its role as a central entity will provide the notification to the CPU 44 when the lock register unit 60 determines that the CPU 44 should get ownership of a particular lock 62.

This operation proceeds as follows:

when CPU 44 "loses" it spins on a special flag in cacheable memory;

after the first access, the read will be from that CPUs cache and will not generate bus traffic; and when CPU 44 is deemed to get ownership, the register unit 60 writes to the flag variable in its memory and issues a snoop bus cycle on the processor bus 50.

The snoop value invalidates the flag value, and CPU 44 issues a read cycle to obtain a new value from the memory 56. New value causes CPU 44 to break out of the spin loop and enter its critical section. The spin flag address value is programmed in the chipset by the JVM, or by a chipset driver on behalf of the JVM. The driver needs to do a virtual-to-physical address translation in order to obtain the physical address corresponding to the particular thread's spin flag.

It is significant to note that dynamic profiling of lock contention and the use of profiling data to select and tune the synchronization technique used in individual significance. They may be embodied in hardware as well as software.

The above-method may be performed by a machine-readable medium. A machine-readable medium includes any mechanism that provides (i.e., stores and/or transmits) information in a form readable by a machine (e.g., a computer). For example, a machine-readable medium includes read-only memory (ROM); random access memory (RAM); magnetic disk storage media; optical storage media; flash memory devices; electrical, optical, acoustical or other form of propagated signals (e.g., carrier of waves, infrared signals, digital signals or other forms of signals).

What is thus provided are a method and apparatus for dynamic profiling of lock contention, method and apparatus for use of profiling data to select and choose a synchronization technique used and platform dependent synchronization acceleration hardware interactive with the dynamic profiling and selection of synchronization techniques. The above-specification will enable those skilled in the art to make many modifications in the particular examples described above to provide methods and apparatus in accordance with the present invention.

What is claimed is:

1. A method comprising:
   utilizing a monitor to control access by competing threads executed by a plurality of processors to a shared resource, said monitor having a data structure to process lock requests, said data structure comprises an extension field to keep a count of unique thread accesses in a given time period;
   storing a number of unique requests for a lock by contending threads in the given time period as said count;
   determining whether said count exceeds a threshold of contention to identify said lock as a "highly contended" lock;
   retaining said count if said count does not exceed said threshold; and
   setting a flag variable in memory accessible by a processor of the plurality of processors not gaining access to said lock, and subsequently modifying said flag variable during a bus snoop cycle to grant access to the processor that did not gain access when a prior processor of the plurality of processors releases said lock, wherein said processor that did not gain access remains in a spin loop and will not generate bus traffic until the subsequent modifying of said flag variable.

2. The method of claim 1 wherein prior to storing said count, the method further comprising sensing a thread request for a monitor, determining if the requesting thread is different from a previous requesting thread and incrementing said count indicative of contentions in response to a comparison indicating that said requesting thread is different from said previously requesting thread.

3. The method according to claim 2, wherein said determining whether said count exceeds said threshold of contention comprising comparing said count with said threshold, determining when said count exceeds said threshold, and identifying a lock as "being highly contended" in response to said count exceeding said threshold.

4. The method according to claim 3, wherein said determining whether said count exceeds said threshold of contention further comprising responding to the identification of said lock as being highly contended for by selecting a lock request in accordance with a method selected for highly contended for locks.

5. The method according to claim 4, wherein said determining whether said count exceeds said threshold of contention comprises processing requests for said lock to a shared resource by the plurality of processors, arbitrating among said requests, providing access to said lock by a winner processor being said prior processor, and issuing to said processor access to said flag variable in cacheable memory.

6. The method according to claim 1 further comprising said processor that did not gain access issuing a read cycle to obtain a new value from a memory element to disrupt said spin loop being run by said processor that did not gain access.

7. The method according to claim 6, wherein said memory element is said memory.

8. A machine-readable medium that provides instructions, which when executed by a processor, causes said processor to perform operations comprising:
   utilizing a monitor to control access by competing threads to a shared resource, said monitor having a data structure to process lock requests;
   providing an extension in said monitor data structure to keep a count of unique thread accesses in a time period; and
   registering a number of unique requests by a plurality of processors for a lock by contending threads and registering a count indicative of the number of contending threads in the time period;
   determining whether the count exceeds a threshold value to identify the lock as a "highly contended" lock;
   retaining the count if the count does not exceed said threshold; and
   setting a flag variable in memory accessible by a first processor of the plurality of processors not gaining access to the lock, and subsequently modifying the flag variable during a bus cycle to grant access to the first processor that did not gain access when a second processor releases the lock, wherein said first processor that did not gain access remains in a spin loop and will not generate bus traffic until the subsequent modifying of said flag variable.

9. The machine-readable medium in accordance with claim 8, wherein the instructions to register the count comprises sensing a thread request for a monitor, determining if a requesting thread is different from a previous requesting thread and incrementing the count indicative of contentions in response to a comparison indicating that the requesting thread is different from the previous requesting thread.

10. The machine-readable medium according to claim 9, wherein the instructions to determine whether the count exceeds the threshold value comprises an instruction of comparing the count with the threshold value, determining when the count exceeds the threshold value, and identifying the lock as being the "highly contended" lock in response to the count exceeding the threshold.

11. The machine-readable medium according to claim 10 further comprising an instruction of responding to the identification of a lock as being highly contended by selecting a lock request in accordance with a method selected for highly contended for locks.

12. The machine-readable medium according to claim 8, wherein the instructions to determine whether said count exceeds said threshold of contention comprises instructions to process requests for the lock to a shared resource by the of the plurality of processors, to arbitrate among the requests, to provide access to said lock by a winner processor being the second processor, and issuing to the first processor access to said flag variable in cacheable memory.

13. A machine-readable medium according to claim 12 wherein said machine-readable medium is a Java virtual machine.

14. The machine-readable medium according to claim 8, wherein after modifying the flag variable during the bus cycle, the first processor to further issue a read cycle to obtain a new value from a memory element to disrupt said spin loop being run by the first processor.

15. The machine-readable medium according to claim 14, wherein the bus cycle is a snoop bus cycle.

* * * * *